United States Patent
Weigel (10) Patent No.: US 9,409,699 B2
(45) Date of Patent: Aug. 9, 2016

(54) CAPILLARY METERING DEVICE AND METHOD FOR OPERATING SUCH A CAPILLARY METERING DEVICE

(71) Applicant: Harro Höfliger Verpackungsmaschinen GmbH, Allmersbach im Tal (DE)

(72) Inventor: Marco Weigel, Weissach im Tal (DE)

(73) Assignee: Harro Höfliger Verpackungsmaschinen GmbH, Allmersbach (DE)

(*) Notice: Subject to any disclaimer, the term of this patent is extended or adjusted under 35 U.S.C. 154(b) by 0 days.

(21) Appl. No.: 13/910,621

(22) Filed: Jun. 5, 2013

(65) Prior Publication Data
US 2013/0334249 A1 Dec. 19, 2013

(30) Foreign Application Priority Data
Jun. 15, 2012 (DE) .................. 10 2012 011 795

(51) Int. Cl.
| | | |
|---|---|---|
| B67D 7/74 | (2010.01) | |
| B65D 83/06 | (2006.01) | |
| A61J 3/07 | (2006.01) | |
| B65B 1/08 | (2006.01) | |
| B65B 1/30 | (2006.01) | |
| B65B 1/36 | (2006.01) | |
| G01F 13/00 | (2006.01) | |
| G01F 11/28 | (2006.01) | |

(52) U.S. Cl.
CPC . *B65D 83/06* (2013.01); *A61J 3/07* (2013.01); *B65B 1/08* (2013.01); *B65B 1/30* (2013.01); *B65B 1/36* (2013.01); *G01F 11/282* (2013.01); *G01F 13/001* (2013.01); *G01F 13/006* (2013.01)

(58) Field of Classification Search
CPC ............ B65D 83/06; B65D 1/30; B65B 1/36; B65B 1/08; A61J 3/07; G01F 11/282; G01F 13/001; G01F 13/006
USPC .......... 222/196, 161, 189.11, 189.08, 189.06, 222/129, 145.1
See application file for complete search history.

(56) References Cited

U.S. PATENT DOCUMENTS

| | | | |
|---|---|---|---|
| 6,416,294 B1 | 7/2002 | Zengerle et al. | |
| 7,665,633 B2 * | 2/2010 | MacMichael et al. | ........ 222/161 |

(Continued)

FOREIGN PATENT DOCUMENTS

GB     2 472 817 A     2/2011

OTHER PUBLICATIONS

Lu X et al.: Ultrasound-assisted microfeeding of fine powders; Particuology; Elsevier, Amsterdam, The Netherlands; vol. 6, No. 1, Feb. 1, 2008; pp. 2-8.

*Primary Examiner* — Patrick M Buechner
*Assistant Examiner* — Jeremy W Carroll
(74) *Attorney, Agent, or Firm* — Gudrun E. Huckett (57) ABSTRACT

A capillary metering device for a powder product has a vibration body with a capillary formed within the vibration body for receiving and conveying the powder product. The vibration body is formed of at least two adjoining body parts, wherein the capillary is formed as a channel with at least one open side in the demounted state in at least one of the body parts. The open side of the channel in the mounted state is closed off by the adjoining body part. The vibration body is caused to vibrate with such an amplitude and frequency that a powder flow of the powder product passes through the capillary formed in the vibration body into a target container and that upon reaching a target quantity of the powder product in the target container the powder flow to the target container is interrupted.

19 Claims, 5 Drawing Sheets

(56) References Cited

U.S. PATENT DOCUMENTS

| | | | |
|---|---|---|---|
| 2002/0100770 A1* | 8/2002 | Strecker | 222/145.1 |
| 2003/0106905 A1* | 6/2003 | Chan et al. | 222/145.1 |
| 2004/0045979 A1* | 3/2004 | Macmichael | 222/1 |
| 2009/0056826 A1* | 3/2009 | Mertens et al. | 141/1 |
| 2010/0006502 A1* | 1/2010 | Schliefer | 210/638 |

* cited by examiner

CAPILLARY METERING DEVICE AND METHOD FOR OPERATING SUCH A CAPILLARY METERING DEVICE

BACKGROUND OF THE INVENTION

The invention concerns a capillary metering device for a powder product comprising a vibration body with a capillary formed within the vibration body for receiving and conveying a powder product; the invention also concerns a method for metering a powder product by means of such a capillary metering device.

Fine-grain powder products, in particular medicaments in powder form, food supplements and the like, must be precisely metered in order to achieve a certain precisely measured administration dosage. Such precisely metered dosage quantities are, for example, filled into hard gelatin capsules or are pressed to tablets.

Frequently, for metering the powder product so-called capillary metering devices are employed. They comprise a vibration body with a capillary that is formed in the vibration body for receiving and conveying the powder product. The cross-section of the substantially vertically oriented capillary is sized and adapted to the material properties of the powder product so that the powder, as a result of its cohesive properties, cannot pass through the stationary capillary but remains adhered thereto. Inasmuch as the vibration body is however excited to perform vibrations with a suitable frequency and amplitude, the cohesive forces are overcome. As a result, a powder flow of the powder product through the capillary that is formed within the vibration body is generated and is guided into a target container. By switching on and switching off the vibration of the vibration body in a targeted fashion, the powder flow can be likewise switched on or switched off in a targeted fashion in order to obtain a certain dosage quantity of the powder product in the target container. In order for this type of metering to function properly in practice, a precise adaptation of the capillary cross-section to the powder properties, in particular the grain size distribution, grain shape, density and composition of the powder to be metered, is required. When too small a cross-section is selected, a powder flow cannot be generated even with vibration excitation of the vibration body. When too large a cross-section is selected, the cohesion forces of the powder inter alia may not be sufficient to stop the powder flow when the vibration excitation is switched off, or to inhibit its generation. For a proper adjustment, flow rates of approximately 1 mg per second up to 10 mg per second can be obtained according to the prior art. However, there is the need for a greater achievable range of flow rates.

For forming the aforementioned capillary, tubes that are comparable to the cannula of an injection syringe are employed according to the prior art. The tubes and the capillaries formed therein in have a circular cross-section that determines decisively the adhesion and flow properties of the powder. Clearly defined adhesion and flow properties can however only be found when the powder itself has a homogenous configuration of its grains. This is not always the case in practice. Individual larger powder grains or local agglomerate formations can lead to clogging of the capillary which impairs the continuous metering operation. Cleaning in case of clogging or a product change is possible only with difficulty because of the minimal capillary cross-section. Moreover, it has been found that even when selecting high-quality tubes the capillary walls have a significant and non-uniform surface roughness that causes flow and adhesion properties that are difficult to predict. A smoothing surface treatment or a suitable surface coating are hardly realizable because of the minimal capillary cross-section so that undesirable fluctuations of the adhesion and flow properties are unavoidable.

The invention has the object to further develop a capillary metering device in such a way that a precise metering with increased reliability is possible.

SUMMARY OF THE INVENTION

This object is solved by a capillary metering device, wherein the vibration body is formed by at least two body parts adjoining each other, wherein the capillary is formed as a channel with at least one open side in the demounted state in at least one of the body parts, wherein the open side of the channel in the mounted state is closed by the adjoining body part.

The invention furthermore has the object to provide a method for metering a powder product by means of such a capillary metering device with which the metering precision and reliability is increased.

This object is solved by a method that is characterized in that the vibration body is caused to vibrate with such an amplitude and frequency that a powder flow of the powder product passes through the capillary formed in the vibration body into a target container and that, upon reaching a target quantity of the powder product in the target container, the powder flow to the target container is interrupted.

According to the invention, it is provided that the vibration body is formed of at least two body parts that adjoin each other wherein the capillary is formed as a channel with at least one open side in the demounted state in at least one of the body parts, wherein the open side of the channel in the mounted state is closed off by the adjoining body part. Because of the multi-part configuration, it is firstly achieved that in the demounted state of the body parts the channel or channels are exposed so that from the open side the channel wall can be machined with the desired smoothness and precision. Moreover, without problem, a corresponding surface coating is possible, as needed. In the mounted state, a capillary with a clearly defined cross-section and clearly defined surface property is provided, leading to unambiguous adhesion properties and unambiguous self-holding action upon standstill of the vibration body and unambiguous flow properties when the vibration body is excited to perform vibrations. When in an appropriate operating method the vibration body is caused to vibrate with a suitable amplitude and a suitable frequency, an exactly defined powder flow to the target container results that can be likewise exactly interrupted, leading to a precise reliable metering action. In case of clogging that still may occur or in case of product change, a simple cleaning action is possible. This includes also the possibility of inspection and sterilization so that also aseptic applications are made possible. With regard to construction, there are no limitations in regard to material selection so that metals, polymers and/or composite materials can be used for the body parts, depending on the requirements. In particular, a simple possibility is provided to adapt the channel geometry to the flow and adhesion properties of the powder product with regard to cross-section and course.

With an appropriate machining, there is the possibility to design the channel in such a way that a capillary with circular cross-section is produced. In particular, it is however made possible that the respective channel, and thus also the capillary that is created in the mounted state, has a non-round, in particular rectangular, cross-section. Such a preferred embodiment is based on the realization that, in addition to the powder properties, the flow and adhesion behavior of the powder product in the capillary depends decisively on the ratio of capillary cross-section to the capillary circumference. For an identical cross-sectional area, a capillary with a non-round cross-section in comparison to a circular cross-section has a greater circumference and thus a greater contact surface of the capillary wall with the powder product which causes greater adhesion forces. It is therefore possible to select for a certain powder product a larger channel cross-sectional area without relinquishing the self-holding action in the state of rest. When however the vibration body is caused to vibrate, the greater channel cross-section causes a likewise greater flow rate. Conversely, in comparison to the prior art, also lower flow rates can be obtained. In practice, it has been found indeed that with the configuration according to the invention flow rates of 0.1 mg per second up to approximately 1 gram per second instead of 1-10 mg per second according to the prior art can be achieved. A further possibility resides in matching the cross-section of the capillary to the opening cross-section of the target container to be filled wherein then also for complex, in particular elongate, container geometries a uniform filling action is possible.

It can be expedient to configure the channel or the channels in only one of the lateral body parts or in both lateral body parts wherein then the respective oppositely positioned body part is a closure element for forming the capillary. In a preferred further embodiment, at least three stacked body parts connected to each other are provided wherein the channel in a central body part is embodied as a slot with two open sides. The two open sides in the mounted state are closed by the two external adjoining body parts for forming the capillary. The slot can be produced precisely with simple means wherein easily also channel shapes that are not linear can be realized. In the mounted state, a capillary that is exact with regard to surface quality and dimensional accuracy of the cross-section is created which in the state of rest has a reliable adhesion action and in the vibrating state favors a reliable formation of a powder flow. The preferably plate-shaped central body part can be varied easily with respect to its thickness in order to provide the desired cross-sectional adaptation of the channel or the capillary formed thereby to the properties of the powder to be metered, respectively. Also, there is the possibility to increase the thickness of the central body part by additional plates or sheets with same contour and slot formation in order to obtain the aforementioned cross-sectional adjustment. As a whole, the system can be adapted easily to different flow and adhesion properties of the powder to be metered, respectively.

It can be expedient to provide the at least one channel and thus the capillary created in the mounted state with a linear, in particular, vertical course. Preferably, the at least one channel has a decelerating deflection. In this way, an improved ratio of the self-holding action in the state of rest to the obtainable flow rate in the vibrating state can be provided.

In a further advantageous embodiment, at least two channels are connected in parallel. This enables, for example, the simultaneous filling of several target containers. Inasmuch as the several channels extend to a common opening, it is also possible to fill an individual target container with increased flow rate without the self-holding action forces in the state of rest being reduced in comparison to a single channel. With an appropriate operating method, it is possible with the aforementioned arrangement to meter simultaneously or sequentially two or more different powders by means of a correlated channel, respectively, and to supply them to the same target container. The different channels can be designed with regard to cross-section and course, with or without decelerating deflection, individually and independent from each other and, in this way, can be matched to the various flow and adhesion properties of the various powders to be metered. Moreover, with an appropriate method, this provide the possibility to carry out by means of the at least two channels initially a coarse metering action and subsequently a fine metering action of the powder product. In particular, for this purpose, the at least two channels have differently sized cross-sections. With the greater one of the two cross-sections and/or with both channels together, first a coarse metering with appropriately great flow rate is carried out. Shortly before reaching the target quantity, one of the two channels, in particular the one with the greater cross-section, is switched off so that then the fine metering action is realized by means of the remaining channel with reduced cross-section and reduced flow rate until the desired target quantity is reached.

It can be advantageous that the interruption of the powder flow to the target container upon reaching the target quantity is realized by switching off the vibration off the vibration body. Preferably, an underpressure connector opens into the at least one channel wherein in the opening area of the underpressure connector a filter is arranged that retains the powder product. The interruption of the powder flow to the target container is realized upon reaching the target quantity by applying an underpressure at the underpressure connector. The underpressure has the effect that the powder contained in the capillary is pulled against the filter and forms a plug thereat which interrupts the powder flow. The plug formation and thus the interruption of the powder flow is realized immediately and without time delay so that a temporally very precise switching off of the powder flow is possible. Switching off the underpressure can be provided as a supplementing action to switching off the vibration drive wherein the powder flow is already interrupted for switched-off vibration drive with still subsiding vibrations. Alternatively, the vibration drive of the vibration body can be operating continuously wherein the formation or interruption of the powder flow is realized exclusively by applying or switching off the vacuum. In particular, in case of the aforementioned parallel connected channels, an independent control of the flow quantity in the individual channels or capillaries can be realized independent of each other.

In an advantageous embodiment, in the channel, relative to its flow direction, two underpressure connectors are arranged sequentially wherein between the two underpressure connectors a metering chamber is formed. In an appropriate operating method metering of the powder product is realized by alternating application of an underpressure at one of the two underpressure connectors. The metering chamber has a precisely defined volume so that an exact volumetric metering of the powder product even without additional measures such as weight control and time control, is possible.

In case of very cohesive powder products that are particularly difficult to handle, measures for assisting the flowability in the vibrating state may be required or expedient. Preferably, for this purpose in the channel a vibration element is arranged which by additional agitation promotes the flow process of the powder. The vibration element can be actively driven, similar to a stirrer, and is advantageously designed as a passive vibration element with an excitation mass that is eccentric to the vibration direction of the vibration body. The eccentric excitation mass effects a passive excitation of the vibration element as a result of the vibration movement of the vibration body without this requiring its own drive action. The flowability of the powder is significantly increased.

BRIEF DESCRIPTION OF THE DRAWINGS

Embodiments of the invention will be explained in the following in more detail with the aid of the drawing. It is shown in.

DESCRIPTION OF PREFERRED EMBODIMENTS

Figures 1, 2:
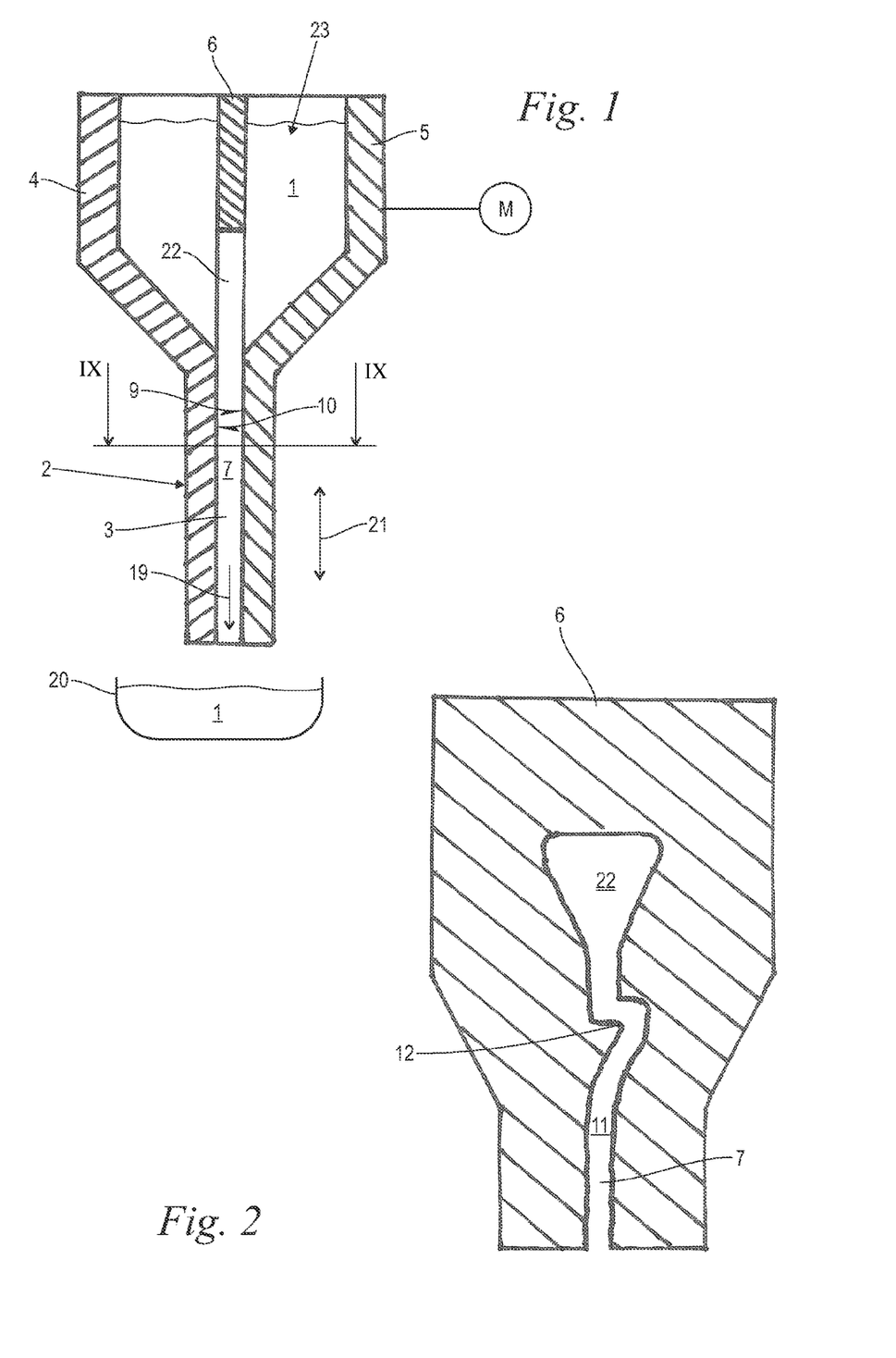
FIG. 1 in a schematic section illustration a first embodiment of a capillary metering device according to the invention with three body parts for forming a capillary.
FIG. 2 in a view rotated by 90 degrees the central body part according to FIG. 1 with a slot formed therein for forming the capillary in the mounted state.

FIG. 1 shows in a cross-sectional illustration a first embodiment of the capillary metering device according to the invention. The capillary metering device comprises a vibration body 2 which is schematically illustrated and in which a capillary 3 is formed that is also schematically illustrated. The capillary 3 is vertical in operation, i.e., oriented parallel to the direction of the weight force. Above the capillary 3 a supply funnel 23 is provided in the vibration body 2 in which a powder product 1, in particular in the form of a medicament or food supplement in powder form, is stored and supplied to the capillary 3. Below the capillary metering device a target container 20, schematically indicated, is arranged into which a certain metered quantity of the powder product 1 is to be introduced by means of the capillary metering device.

The capillary 3 serves for receiving and conveying the powder product 1 into the target container 20. For this purpose, it is matched with regard to its geometric configuration to the flow and adhesion properties of the powder product 1 in such a way that, in the state of rest of the vibration body 2 the self-holding action of the powder product 1 contained within the capillary 3 sets in as a result of the acting cohesion forces. Based on the aforementioned state of rest, the vibration body 2 by means of a vibration drive M can be caused to vibrate in a vibration direction 21 indicated by a double arrow wherein here the vibration direction 21 is oriented in the direction of the longitudinal axis of the capillary 3. However, a different vibration direction 21 may be expedient also. The vibration body 2 is caused to vibrate by the vibration drive M with such an amplitude and frequency that the aforementioned cohesion forces are overcome so that a powder flow 19 of the powder product 1 in the capillary 3 under the effect of the weight force is generated. The generated powder flow 19 transfers a partial quantity of the powder product 1 from the supply funnel 23 through the capillary 3 into the target container 20. Upon reaching a target quantity of the powder product 1 in the target container 20, the powder flow 19 to the target container 20 is interrupted. This can be done by switching off the aforementioned vibration movement caused by the vibration drive M and/or by a vacuum control to be described in the following, or even by other suitable means.

The vibration body 2 is comprised of at least two, here three, adjoining body parts 4, 5, 6 that are connected in a stacked arrangement. In the illustrated embodiment, the capillary 3 is embodied as a channel 7 with at least one open side 9, 10 in the demounted state in at least one of the body parts 4, 5, 6, here in the central body part 6, wherein the open side 9, 10 of the channel 7 in the mounted state is closed by the respective adjoining body part 4, 5, 6, here by the two outer body parts 4, 5.

FIG. 2 shows in a schematic illustration rotated by 90 degrees the central body part 6 according to FIG. 1. It is configured as a flat monolithic sheet wherein the channel 7 in the central body part 6 is embodied as a slot 11. When looking at both FIGS. 1 and 2, the slot 11 that penetrates the plate-shaped body part 6 completely and the channel 7 formed thereby have at both faces of the central body part 6 an open side 9, 10, respectively. In the mounted state according to FIG. 1, the open side 9 is covered by the adjoining body part 5 and the oppositely positioned open side 10 is covered by the adjoining body part 4. The channel 7 that in the demounted state according to FIG. 2 is open at both faces but in the mounted state according to FIG. 1 is provided with a peripherally closed cross-section forms the capillary 3. Moreover, when looking at both FIGS. 1 and 2, the slot 11 above the channel 7 is widened to an inlet area 22 which in the mounted state according to FIG. 1 is positioned within the supply funnel 23. The inlet area 22 enables flow of the powder product 1 from the supply funnel 23 into the capillary 3.

The slot 11 forming the channel 7 can extend in a linear configuration. In the illustrated embodiment, it has optionally a non-linear course with formation of a decelerating deflection 12 which enhances the self-holding action of the powder product 1 in the capillary 3. Based on the slot 11, the configuration of the central body part 6 as a flat plate, and the two-sided covering of the two open sides 9, 10, it is apparent that the channel 7 and thus the capillary 3 has a non-round, here rectangular, cross-section. However, also deviating cross-sectional shapes of any kind, including circular, elliptical or non-regular cross-sectional shapes, can be realized. Based on the configuration of the central body part 6 as a flat plate or as a flat sheet, it is also apparent that the cross-section or the free cross-sectional area of the capillary 3 is defined also by the thickness of the plate or the sheet in addition to the channel width or slot width. The cross-section of the capillary 3 can therefore be variably adjusted simply by selecting a certain thickness of the plate or the sheet. Moreover, for obtaining a certain total thickness, several such plates or sheets in the form of the illustrated central body part 6 can be stacked for a cross-sectional adaptation of the capillary 3.

Figures 3, 4:
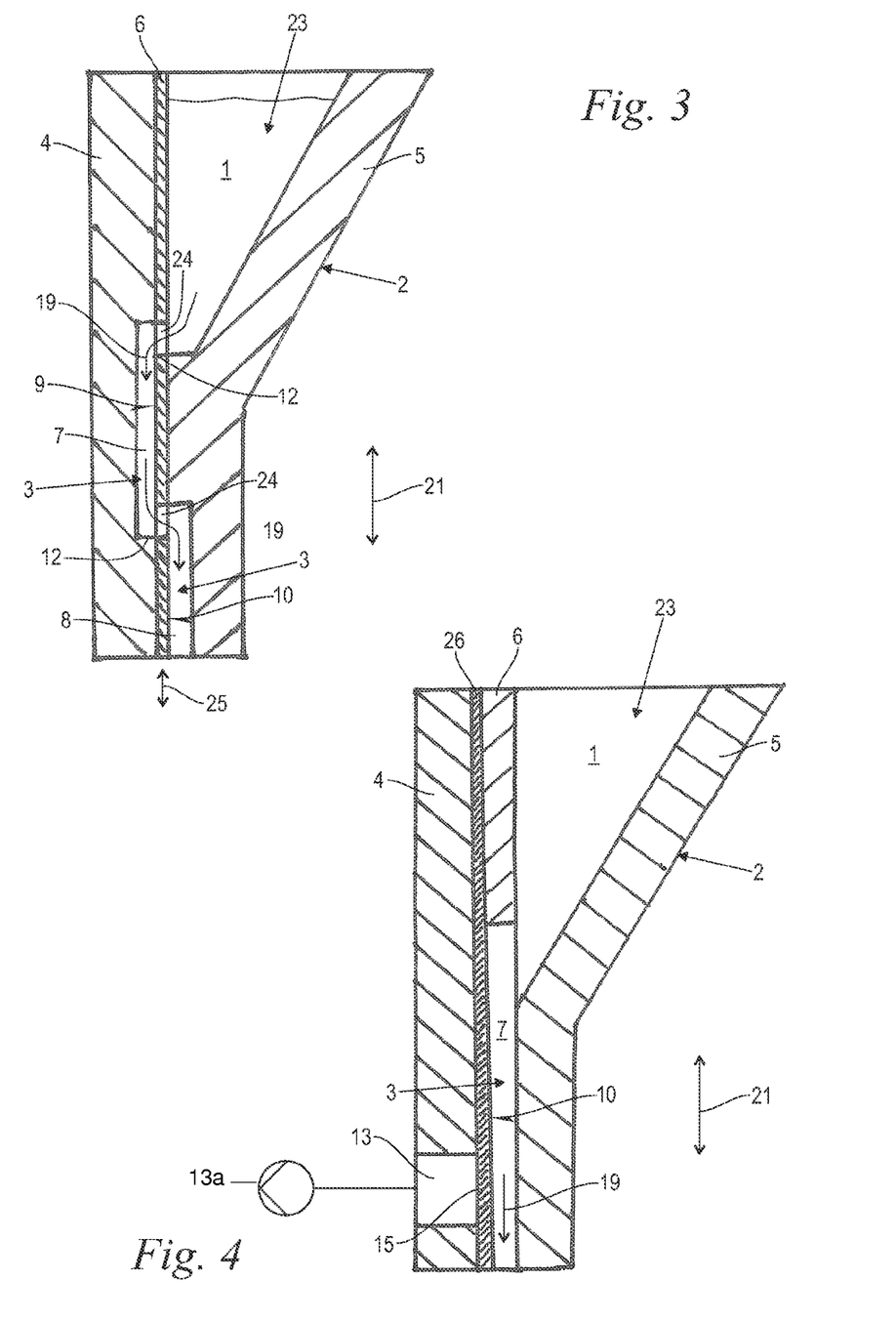
FIG. 3 a variant of the arrangement according to FIG. 1 with channels formed in the two outer body parts for forming the capillary.
FIG. 4 a further variant of the capillary metering device according to FIG. 1 or 3 with an underpressure connector for interrupting the powder flow.

FIG. 3 shows in a schematic cross-sectional illustration a variant of the capillary metering device according to FIG. 1. In this context, the supply funnel 23 is formed only in the right body part 5 while the left body part 4 has substantially the shape of a flat plate. The capillary 3 is formed by a total of two channels 7, 8. The first channel 7 is formed in the planar surface of the left body part 4 that is facing the right body part 5 and has in the demounted state an open side 9 that is facing the right body part 5. The second channel 8 is formed in the right body part 5 on its surface that is facing the left body part 4 and has in the demounted state an open side 10 that is facing the left body part 4. Between the two body parts 4, 5, optionally a third body part 6 is arranged and closes off in the mounted state the open sides 9, 10 of the channels 7, 8 so that a closed cross-section of the capillary 3 is provided. However, it can also be expedient to eliminate the central body part. In this case, the open sides 9, 10 in the mounted state are closed by the adjoining surfaces of the respective oppositely positioned body parts 5, 4.

With regard to the vertical direction, the first channel 7 adjoins the bottom of the supply funnel while the second channel 8 adjoins the bottom of the first channel 7. In both adjoining areas the central body part 6 is provided with a port 24, respectively, through which in vibrating operation the powder flow 19 of the powder product 1 can flow from the supply funnel 23 into the first channel 7 and from there into the second channel 8. The two ports 24 each form a decelerating deflection 12 which, comparable to the decelerating deflection 12 according to FIG. 2, increase the self-holding action of the powder product 1 in the capillary 3.

In an optional embodiment the central body part 6 with the two ports 24 can be designed to be slidable relative to the remaining body parts 4, 5 in the vertical direction in accordance with the double arrow 25. In this way, the ports 24 can be moved relative to the transition area between the supply funnel 23 and the first channel 7 as well as relative to the transition area from the first channel 7 to the second channel 8 so that the free cross-sectional area of the ports 24 and thus the flow rate of the powder flow 19 that is generated in vibration operation can be adjusted. This includes also the possibility of a mechanically designed complete switching off of the powder flow 19 in that the central body part 6 with its ports 24 is moved to such an extent that the ports 24 are closed off by the adjoining body parts 4, 5.

FIG. 4 shows in a schematic cross-sectional illustration a further variant of the capillary metering device according to FIGS. 1 to 3 wherein here also the supply funnel 23 is formed only in the right body part 5. The third body part 6 is provided with a channel 7 that in the demounted state is open at both faces and corresponds in its configuration substantially to the third body part 6 according to FIG. 2 while the body parts 4, 5 in deviation from the embodiment according to FIG. 3 have no channels 7, 8. The left first body part 4 is configured as a flat plate with an underpressure connector 13 wherein the underpressure connector 13 opens into the channel 7. Between the first body part 4 and the third body part 6, a fourth body part 26 in the form of a flat plate is arranged that closes off the open side 10 of the channel 7 that is facing it and that moreover carries in the opening area of the underpressure connector a filter 15 retaining the powder product 1. Inasmuch as for metering the powder product 1 a powder flow 19 is to be generated, the vibration body 2 is excited by the vibration drive M to carry out vibrations in the vibration direction 21. When doing so, no underpressure is acting on the underpressure connector 13. As described in connection with FIG. 1, the powder flow 19 is generated. Upon reaching the metered target quantity of the powder product 1 in the target container 20 (FIG. 1), the vibration movement of the vibration body 2 can be switched off. As the vibration drive M is switched off, the vibration movement however will not stop immediately and directly. Instead, the vibrations of the vibration body 2 subside during a short period of time within which the powder flow 19 partially continues. In order to avoid an excess dosage as a result of this, the underpressure connector 13, when the aforementioned target quantity is reached, is connected with an underpressure or vacuum source 13a so that the underpressure that is acting at the underpressure connector 13 is acting through the filter 15 also onto the capillary 3. In this way, the powder product 1 in the capillary 3 is sucked against the filter 15 and retained by the filter 15 so that the powder product 1 cannot pass into the underpressure connector 13. As a result, on the filter 15 a powder plug is formed that immediately interrupts the powder flow 19 even when the vibrations of the vibration body 2 are still subsiding or the vibration body is even in completely driven vibration mode. The latter enables as a supplement also a method for control or interruption of the powder flow 19 upon reaching the aforementioned target quantity even in case of the vibration body 2 being driven permanently or continuously.

Figure 5:
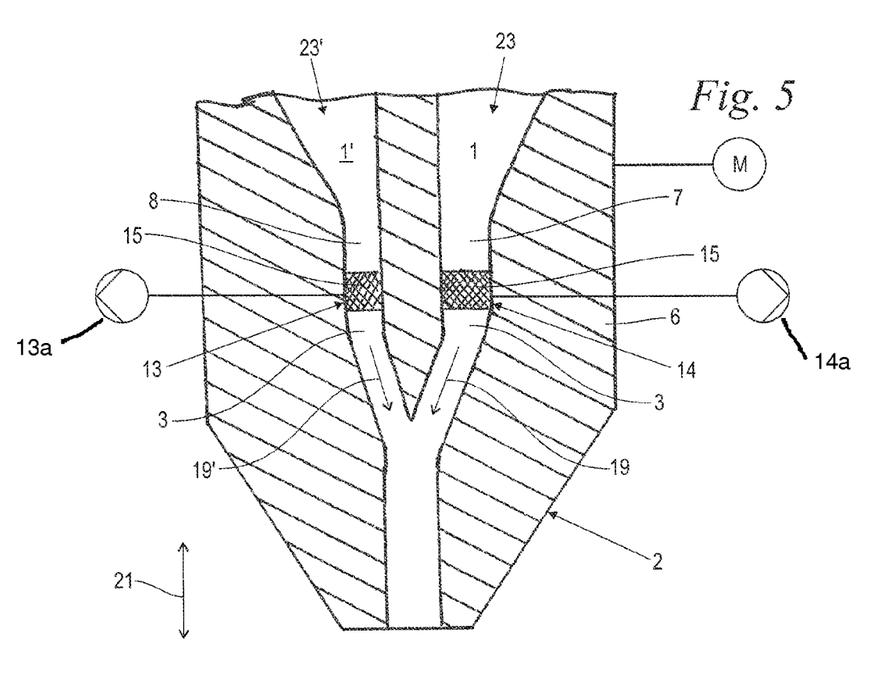
FIG. 5 in a section illustration a further embodiment of a capillary metering device with two channels that are connected in parallel and that each have an underpressure connector.

FIG. 5 shows in a schematic longitudinal illustration a further embodiment of the capillary metering device with a vibration body 2, wherein in the vibration body 2 at least two, here precisely two, parallel connected capillaries 3 are formed by at least two, here precisely two, parallel connected channels 7, 8. The two parallel connected capillaries 3 or channels 7, 8 each can have their own opening in the lower exit area so that simultaneous filling of an appropriate number of target containers 20 (FIG. 1) is possible. In the illustrated embodiment, the channels 7, 8 or the capillaries 3 formed thereby are combined in a Y-shape to a common lower opening.

Each of the channels 7, 8 is connected to its own underpressure connector 13, 14 that are independently switchable and each provided with a filter 15. As disclosed in connection with FIG. 4, in this way the powder flows 19, 19' in the channels 7, 8 can be controlled independently from each other.

Because of the presence of several capillaries 3 or channels 7, 8 and their independent control action, different methods according to the invention can be performed. On the one hand, in the two correlated supply funnels 23, 23' different powder products 1, 1' can be stored so that the different powder products 1, 1' depending on the control action of the underpressure connectors 13, 14 can be metered sequentially or also simultaneously and filled into the target containers 20 (FIG. 1) by means of the controlled powder flows 19, 19'. It is also possible to store in the supply funnels 23, 23' the same powder product 1 wherein instead of several supply funnels 23, 23' also a common supply funnel 23 for the same powder product 1 for the different capillaries 3 or channels 7, 8 can be provided. This provides the possibility that by means of the at least two channels 7, 8 first a coarse metering action and subsequently a fine metering action of the powder product 1 is performed. For example, first both channels 7, 8 can be released by means of the correlated underpressure connectors 13, 14 whereby the two powder flows 19, 19' will add up to a total flow with an appropriately large flow rate. Shortly before reaching the metered target quantity, one of the two channels 7, 8 is then loaded by means of the correlated underpressure connector 13, 14 and underpressure or vacuum source 13a, 14a with underpressure so that the respective powder flow 19, 19', as described in connection with FIG. 4, is interrupted. The remaining powder flow 19' that is not switched off then causes a correspondingly reduced flow rate for the fine metering action until finally the desired target quantity of the powder product 1 in the target container 28 (FIG. 1) is reached with the required precision. In supplementing this, in accordance with the illustration according to FIG. 5 it can be advantageous that the at least two channels 7, 8 have cross-sections that are sized differently. In the embodiment according to FIG. 5, the channel 7 has a greater cross-section than the channel 8. The channel 8 with the smaller cross-section enables an even more precise fine metering in accordance with the above described method. Also, it can be expedient to carry out the afore described coarse metering solely by means of the channel 7 provided with the larger cross-section.

Figure 6:
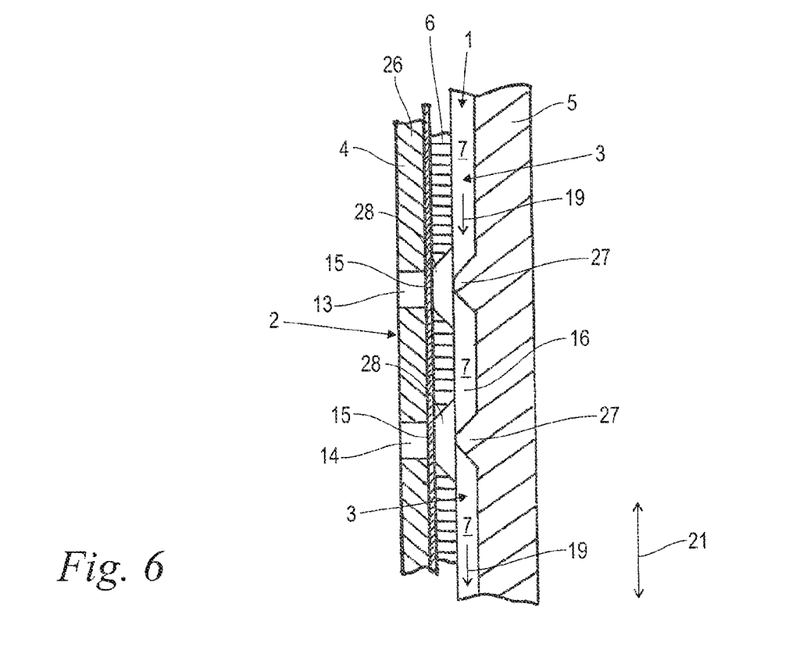
FIG. 6 a variant of the embodiment according to FIG. 4 with two underpressure connectors that are switched in series and a metering chamber arranged therebetween.

FIG. 6 shows in a longitudinal section illustration a further embodiment of the capillary metering device as a detail of a vibration body 2. The channel 7 is formed for forming the capillary 3 in the right body part 5 while the further body parts 4, 6, 26 are embodied as flat plates. In deviation from the embodiment according to FIG. 4, in the channel 7, relative to its flow direction in accordance with the powder flow 19, two underpressure connectors 13, 14 are sequentially arranged wherein the underpressure connectors 13, 14 are formed in the left body part 4 and, by means of correlated filters 15 secured in the body part 26, open into the channel 7 at a relative vertical spacing. Between the two underpressure connectors 13, 14 the channel 7 forms a metering chamber 16 whose metering volume is exactly determined by the spacing of the two underpressure connectors 13, 14 from each other and by the cross-section of the channel 7.

In a corresponding operating method according to the invention, a volumetric metering can be performed in this way. For this purpose, metering of the powder product 1 is done by alternating application of underpressure at one of the two underpressure connectors 13, 14. The vibration body 2 is preferably continuously driven for vibrating in the vibration direction 21 wherein first underpressure is applied to the lower underpressure connector 14. Above it, the powder flow 19 is generated until the metering chamber 16 is filled with the powder product 1. Subsequently, the upper underpressure connector 13 is loaded with underpressure so that in the afore described way a powder plug is formed that prevents further flow of powder product into the metering chamber 16. At the same time with application of the underpressure at the upper underpressure connectors 13, or later, the underpressure at the low underpressure connector is switched off so that the powder product 1 that has been volumetrically metered in the metering chamber 16 is flowing in downward direction according to powder flow 19 into the target container 20 (FIG. 1). After this has happened, underpressure is applied again at the lower underpressure connector 14 while at the same time, or later, the underpressure at the upper underpressure connector 13 is switched off so that again the powder product 1 can flow into the metering chamber 16 until it is completely filled. Based on this, a new volumetric metering in the afore described way can be realized.

In the embodiment according to FIG. 6 it can be expedient that the channel 7 extends linearly and continuously. In the illustrated optional embodiment, the right body part 5 in the area of the underpressure connectors 13, 14 has projections 27 that project into the channel 7 with appropriate recesses 28 correspondingly arranged in the adjoining body part 6. At the base of the recesses 28 the filters 15 are arranged. The interaction of projections 27 with recesses 28 promotes the plug formation that controls or interrupts the powder flow 19 at the filters 15 and thus promotes the precision of volumetric metering in the metering chamber 16.

Figure 7:
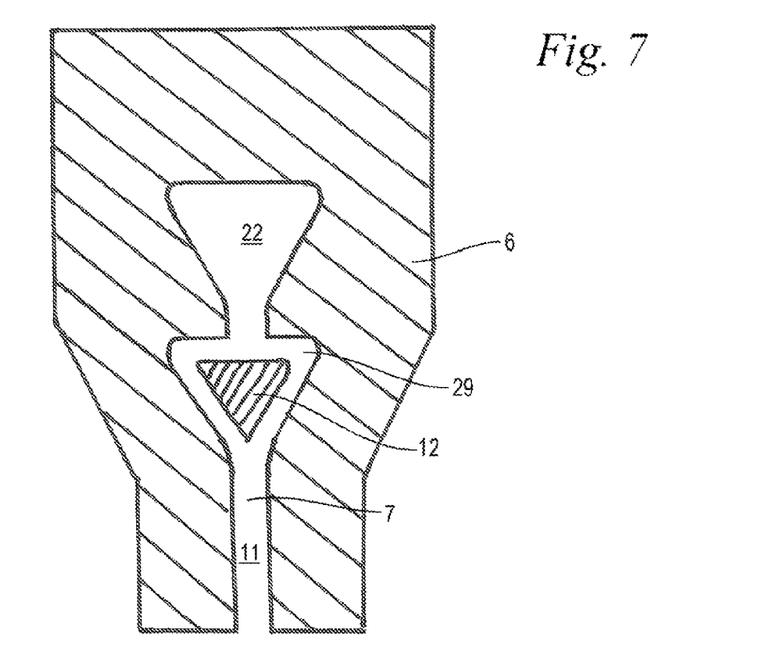
FIG. 7 a variant of the central body part according to FIG. 2 with a decelerating deflection that is formed by an adjoining body part.

FIG. 7 shows in a schematic illustration a variant of the body part 6 according to FIG. 2. In contrast to the embodiment of FIG. 2, the slot 11 has in the area of the channel 7 that is formed by it an expanded section 29 into which in the mounted state a decelerating deflection 12 of an adjoining body part 4, 5 (FIG. 1) engages. It is thus not required that the decelerating deflection 12, in accordance with the illustration of FIG. 2, is formed on the component in which also the appropriate channel 7 is formed. Instead, the decelerating deflection 12, in accordance with illustration of FIG. 7, can also be formed by a separate component.

Figure 8:
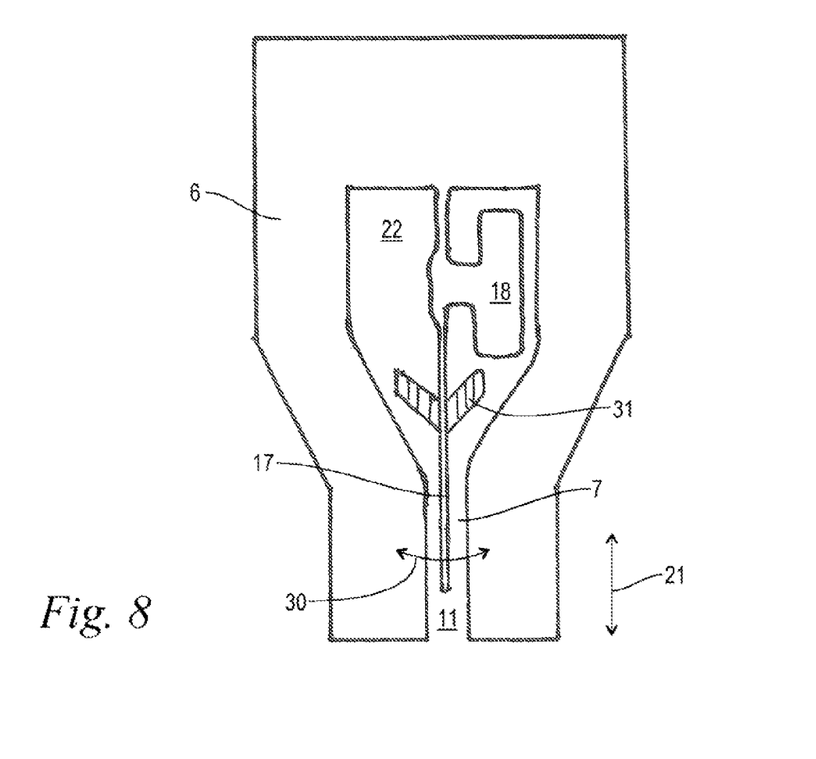
FIG. 8 a further variant of the central body part according to FIG. 2 or 7 with a passive vibrating element formed therein.
Figure 9:
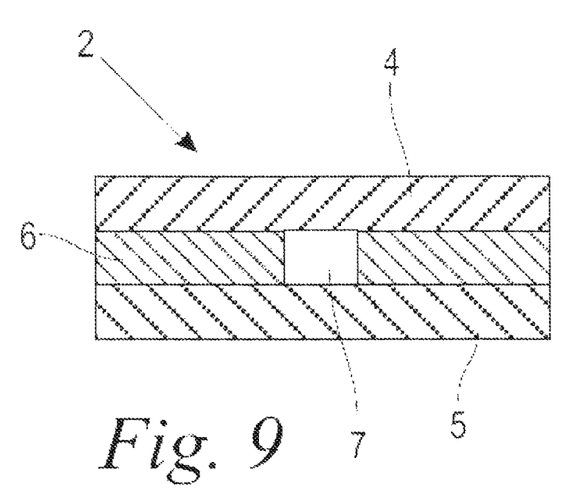
FIG. 9 shows schematically a cross-section of the channel in the vibration body in a section view along the section line IX in FIG. 1.

Finally, in FIG. 8 a further variant of the body part 6 according to FIGS. 2 and 7 is illustrated. Here, in the channel 7 that is formed by the slot 11, a vibration element 17 is arranged by means of which the configuration of a powder flow 19 in the channel 7 (FIG. 1) is promoted even for highly cohesive powders. The vibration element 17 can be an active vibration element with its own drive action, and, in the illustrated embodiment, is a passive vibration element which is caused to vibrate by the vibration movement of the vibration body 2 (FIG. 1) in the vibration direction 21. For this purpose, the vibration element 17 at the upper section of the inlet area 22 is fixedly connected, here monolithically connected, with the body part 6. Moreover, the vibration element 17 has an excitation mass 18 which is positioned within the inlet area 22 that relative to the longitudinal axis of the vibration element 17 and the vibration direction 21 is laterally or eccentrically positioned. By means of the aforementioned eccentricity, the vibration movement of the vibration body 2 (FIG. 1) in the vibration direction 21 is converted to a vibration excitation of the vibration element 17 transversely thereto in accordance with the double arrow 30. Optionally, the vibration element 17 can also have stirring vanes 31 which enhance the agitation action of the vibration element 17 onto the powder product 1.

Inasmuch as nothing to the contrary is indicated, the illustrated embodiments are identical relative to each other with regard to their other features and reference characters. Also, the features of each of the embodiments can be combined with features of the other embodiments.

The specification incorporates by reference the entire disclosure of German priority document 10 2012 011 795.7 having a filing date of Jun. 15, 2012.

While specific embodiments of the invention have been shown and described in detail to illustrate the inventive principles, it will be understood that the invention may be embodied otherwise without departing from such principles.

What is claimed is:

1. A capillary metering device for a powder product, the capillary metering device comprising:
    a vibration body comprising a capillary formed within the vibration body for receiving and conveying a powder product;
    the vibration body further comprising a supply funnel with an open end, the supply funnel configured to store the powder product and to supply the powder product to the capillary arranged downstream of the supply funnel;
    a vibration drive operatively associated with the vibration body to cause, when activated, the vibration body to vibrate at a frequency and an amplitude suitable to convey the powder product in the capillary;
    wherein the vibration body comprises several body parts adjoining each other lengthwise in a direction from the open end of the supply funnel to an opening of the capillary remote from the supply funnel, the body parts including a first body part and a second body part;
    wherein the capillary is formed as a channel within at least the first body part and has a first open side extending across a length of the channel in a demounted state of the body parts;
    wherein the first open side of the channel in the mounted state of the body parts is closed by the second body part adjoining the first body part.

2. The capillary metering device according to claim 1, wherein the channel has a non-round cross-section.

3. The capillary metering device according to claim 2, wherein the channel has a rectangular cross-section.

4. The capillary metering device according to claim 2, wherein the vibration body includes a third body part and the first, second, and third body parts are stacked and connected to each other, wherein the channel in the first body part is formed as a slot and has a second open side closed by the third body part.

5. The capillary metering device according to claim 1, wherein the channel has a decelerating deflection.

6. The capillary metering device according to claim 1, wherein the vibration body comprises at least two of said channel connected in parallel.

7. The capillary metering device according to claim 6, wherein the at least two channels have differently sized cross-sections.

8. The capillary metering device according to claim 1, comprising an underpressure connector connected to an underpressure source, wherein the underpressure connector opens into the channel, wherein the underpressure connector has a filter retaining the powder product and the filter is arranged in an opening area of the underpressure connector.

9. The capillary metering device according to claim 8, wherein the channel relative to a flow direction of the powder product through the channel has two of said underpressure connectors arranged in sequence, wherein between said two underpressure connectors a metering chamber is formed.

10. The capillary metering device according to claim 1, comprising a vibration element arranged in the channel.

11. The capillary metering device according to claim 10, wherein the vibration element is a passive vibration element with an excitation mass that is eccentric to a vibration direction of the vibration body.

12. A method for metering a powder product by a capillary metering device according to claim 1, the method comprising:

causing the vibration body to vibrate with such an amplitude and frequency that a powder flow of the powder product passes through the capillary formed in the vibration body into a target container;

interrupting, upon reaching a target quantity of the powder product in the target container, the powder flow to the target container.

13. The method according to claim 12, wherein the step of interrupting includes switching off the vibration of the vibration body.

14. The method according to claim 12, wherein an underpressure connector opens into the channel, wherein, in an opening area of the underpressure connector a filter is arranged that retains the powder product, and wherein the step of interrupting includes applying an underpressure at the underpressure connector.

15. The method according to claim 14, comprising the steps of providing at least two channels connected in parallel to each other and performing first coarse metering and subsequently fine metering of the powder product through the at least two channels.

16. The method according to claim 15, wherein the at least two channels have differently sized cross-sections.

17. The method according to claim 14, wherein, relative to a flow direction of the powder product, two of said underpressure connectors are arranged in sequence in the channel and between said two underpressure connectors a metering chamber is formed, the method comprising the step of metering the powder product by alternatingly applying an underpressure at one of said two underpressure connectors.

18. The method according to claim 12, comprising the steps of providing at least two channels connected in parallel to each other and metering with the at least two channels different powder products.

19. The capillary metering device according to claim 1, wherein the supply funnel is formed in at least one of the several body parts.

* * * * *